United States Patent [19]

Kamachi et al.

[11] 4,203,031
[45] May 13, 1980

[54] AUTOMATIC FOCUSSING APPARATUS FOR MICROSCOPE

[75] Inventors: Shinichi Kamachi, Hino; Nagahiro Gocho, Hachiodi, both of Japan

[73] Assignee: Olympus Optical Co., Ltd., Japan

[21] Appl. No.: 885,546

[22] Filed: Mar. 13, 1978

[30] Foreign Application Priority Data

Mar. 23, 1977 [JP] Japan ............................ 52-31071

[51] Int. Cl.$^2$ ............................................. G01J 1/20
[52] U.S. Cl. ........................................ 250/201; 250/204
[58] Field of Search ............. 250/201, 204, 208, 209; 354/25; 356/4

[56] References Cited

U.S. PATENT DOCUMENTS

| | | | |
|---|---|---|---|
| 3,857,031 | 12/1974 | Sinclair et al. ........................ | 356/4 |
| 3,967,110 | 6/1976 | Rogers et al. ........................ | 250/201 |
| 4,078,171 | 3/1978 | Stauffer ................................ | 250/209 |

*Primary Examiner*—David C. Nelms
*Attorney, Agent, or Firm*—Lerner, David, Littenberg & Samuel

[57] ABSTRACT

An automatic focussing apparatus for microscopes includes a pair of photoelectric transducer elements disposed short of and beyond the imaging position, respectively, of an optical system which is used for the purpose of focussing. Each element is connected with a separate loop comprising an A/D converter which converts an output signal from the associated element corresponding to each picture element into a digital quantity, a sample-and-hold circuit, a calculation circuit which responds to the digital signal to derive an evaluation function, and an accumulator which stores the resulting value. The individual accumulators are connected with a comparison circuit, which is in turn connected with a focus control circuit controlling the optical system.

6 Claims, 2 Drawing Figures

AUTOMATIC FOCUSSING APPARATUS FOR MICROSCOPE

BACKGROUND OF THE INVENTION

The invention relates to an apparatus which achieves an automatic focussing of an optical system used in a microscope.

It is known to achieve an automatic focussing of an optical system by photoelectrically detecting a variation in the sharpness of an image of an object. The conventional arrangement utilizes a photoelectric transducer element which translates the distribution of illuminance of the image into a corresponding electrical signal, which is then processed in a suitable manner to achieve the focussing operation. The signal has been processed in analog form, and this resulted in a complex arrangement and a reduced processing rate as well as a level of accuracy which is less than desirable. While a digital processing system is known, it represents a mere digital version of the analog processing arrangement which failed to overcome the disadvantages mentioned above. In particular, in the application of an automatic focussing apparatus to a microscope, attention must be directed to the fact that a specimen on the microscope is not always a closely related assembly, which prevented a satisfactory focussing of high accuracy or even the focussing operation itself from being achieved.

SUMMARY OF THE INVENTION

It is an object of the invention to provide an apparatus of achieving an automatic focussing operation of high accuracy, by utilizing a digital processing technique and using a specific evaluation function.

In accordance with the invention, a signal from a photoelectric transducer element is converted into a digital quantity to derive density information $P_i$ of each picture element of the image, the picture elements being the smallest subdivision of a television or facsimile image. A calculation circuit derives an evaluation function $\Sigma(P_i - P_{i-1})^2$ of adjacent picture elements $P_i$ and $P_{i-1}$. The calculation circuit may also derive another evaluation function $\Sigma(P_i - P_{i-2})^2$ of spaced picture elements $P_i$ and $P_{i-2}$. By changing the evaluation function, the determination level of the focussed condition is improved, covering from a fine to a coarse structure of the object. By utilizing a plurality of scans and the accumulation of information from individual scans, the focussing accuracy is improved even for an object which is not a closely related assembly.

DESCRIPTION OF PREFERRED EMBODIMENTS

Figure 1:
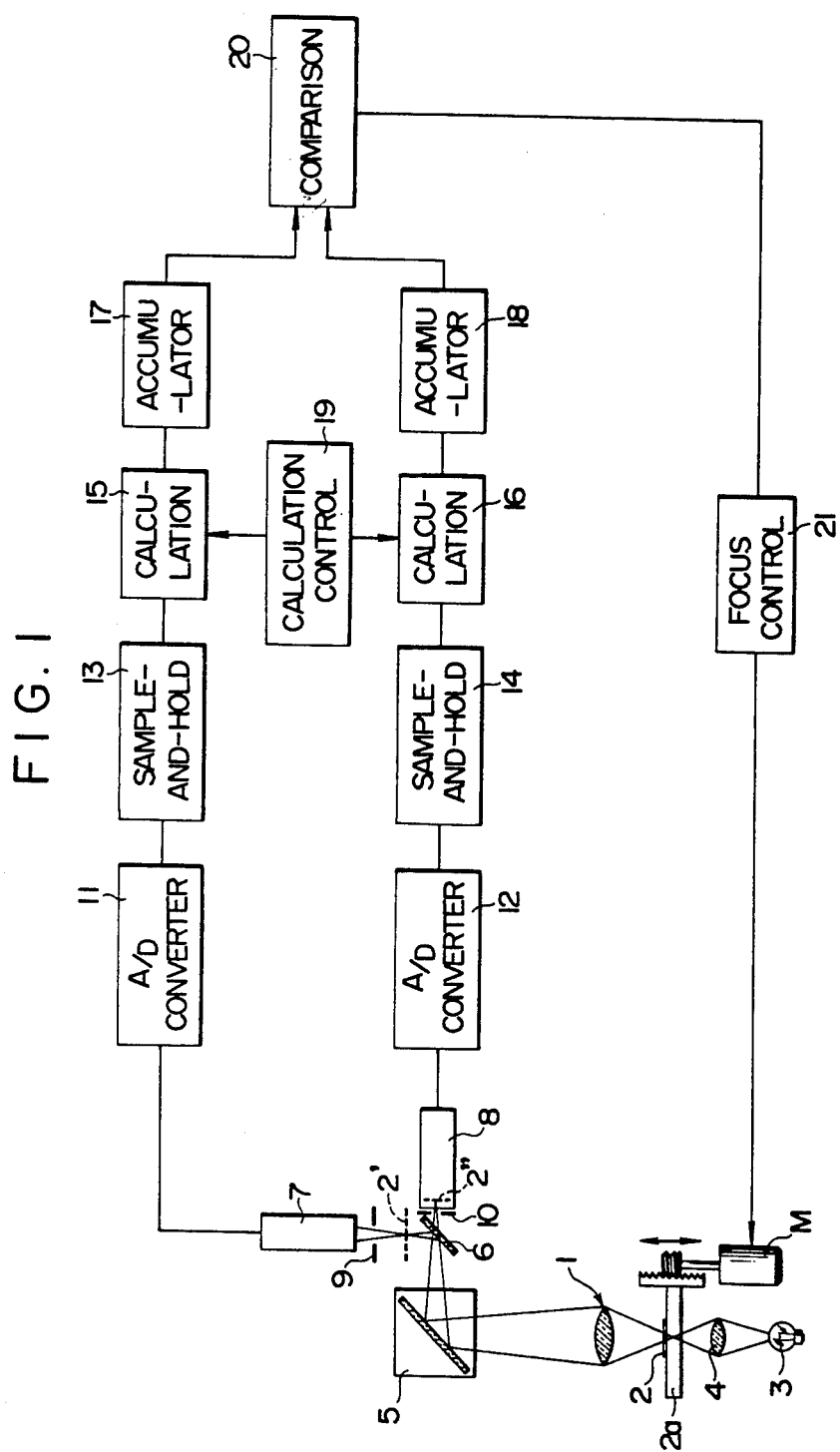
FIG. 1 is a block diagram of the automatic focussing apparatus of the invention, shown together with a schematic view of a microscope system.

Referring to FIG. 1, there is shown a microscope including an objective lens 1 which is disposed in opposing relationship with a stage 2a on which a specimen 2 is placed. The stage 2a is adapted to be driven in the direction of the optical axis by a focussing mechanism including a drive motor M. The specimen 2 on the stage is illuminated from a light source 3 through a condenser lens 4, and an image of the specimen illuminated is passed through the objective 1 to be scanned by a scanner 5, which may comprise a rotating or oscillating mirror, for example. The scanned beam is directed to a half mirror 6, which splits the beam into beam portions impinging on a pair of photoelectric transducer elements 7, 8 through pinholes 9, 10, respectively. It will thus be seen that a train of time spaced signals are produced by the elements 7, 8. The pinholes 9, 10 are located in front of respective associated elements 7, 8 in a manner such that the pinhole 9 is located behind the imaging position 2' of the objective 2 as reflected by the half mirror 6 while the pinhole 10 is located short or forwardly of the imaging position 2" of the specimen as focussed by the objective 1 and transmitting through the half mirror 6.

The output of each of the respective photoelectric transducer elements 7, 8 is connected with an associated analog-to-digital converter (hereafter referred to as A/D converter) 11, 12, which is in turn connected with a sample-and-hold circuit 13, 14, respectively. An evaluation function calculation circuit 15, 16 is connected with the output of each circuit 13, 14. The calculation circuit 15, 16 is adapted to derive an evaluation function $\Sigma(P_i - P_{i-1})^2$ or $\Sigma(P_i - P_{i-2})^2$ based on the density information $P_i$ of each individual picture element. In this manner, a variation of contrast or differential contrast between adjacent picture elements or between picture elements which are spaced apart by two picture elements is determined. The evaluation function $\Sigma(P_i - P_{i-2})^2$ may be effectively chosen for focussing purposes for an image having an increased proportion of low spatial frequency components. The choice of these evaluation functions or any other evaluation function is determined by a calculation control circuit 19 connected with the circuits 15 and 16.

The output of each calculation circuit 15, 16 is connected with an accumulator 17, 18 which in turn feeds an input to a comparison circuit 20. The comparison circuit 20 produces an output which is applied to a focus control circuit 21 for controlling the energization of the drive motor M.

It will be seen that the light image of the specimen 2 scanned by the scanner 5 impinges upon the elements 7, 8, the output of which is converted into digital signals which are temporarily stored in the circuits 13, 14. The evaluation function calculated by the circuits 15, 16 is accumulated in the accumulators 17, 18. It is to be noted that the accumulators 17, 18 may store the evaluation functions produced during a single scan or a plurality of scans. The sum of signals stored in the accumulators 17, 18 is inputted to the comparison circuit, and any difference therebetween is fed to the focus control circuit 21. The difference output determines the direction in which the stage 2a is to be moved and the amount of such movement, and accordingly the drive motor M is energized by an output from the control circuit 21 to complete the adjustment of the focus. While in the embodiment above, the focussing is adjusted by a movement of the stage 2a in the direction of the optical axis by a drive from the motor M, it should be understood that instead of moving the stage 2a, the objective 1 may be moved in a similar manner.

Figure 2:
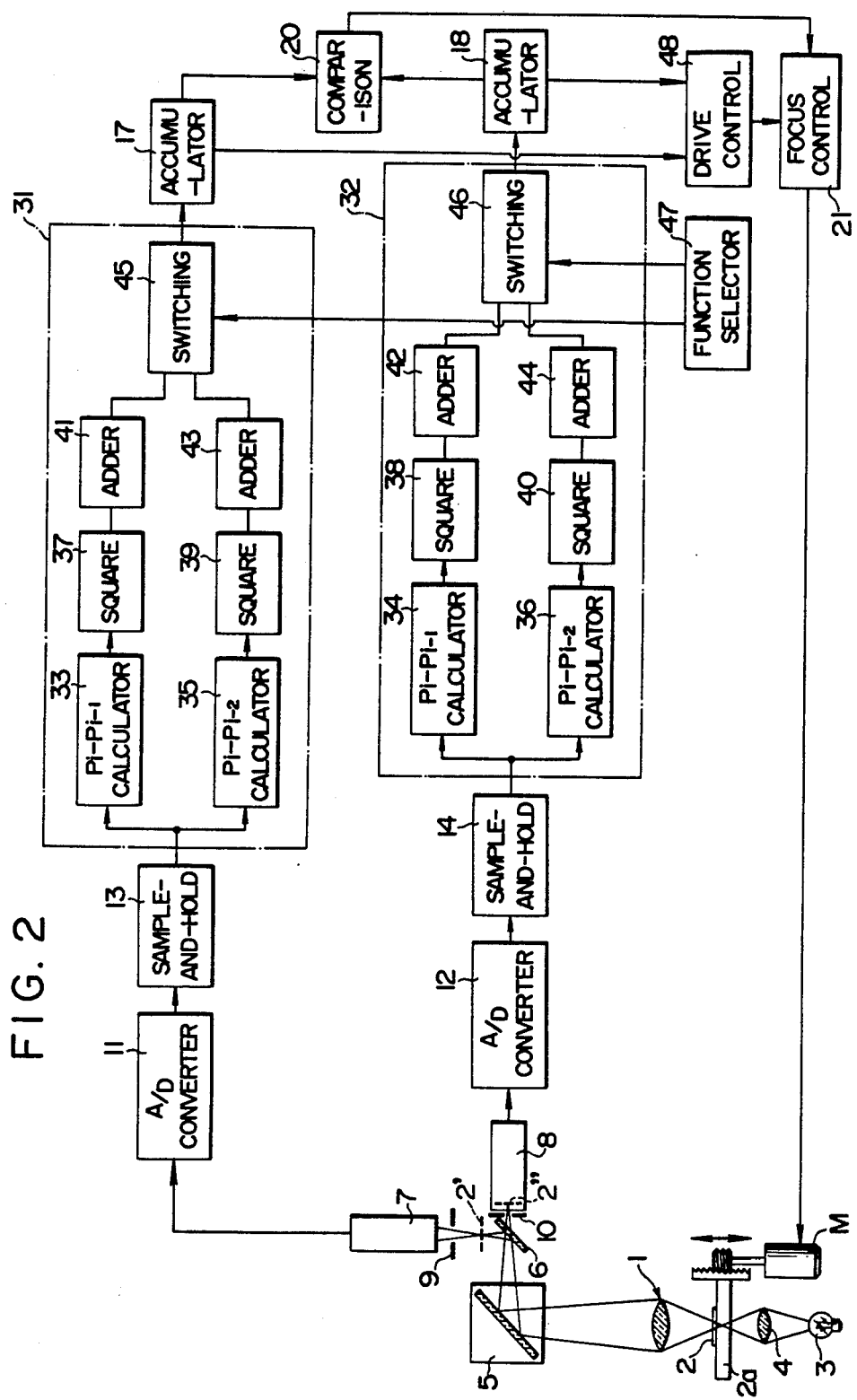
FIG. 2 is a similar view of another embodiment of the automatic focussing apparatus of the invention.

FIG. 2 shows another embodiment of the invention. It will be noted that the general arrangement is similar to the previous embodiment except that the circuit arrangement subsequent to the sample-and-hold circuits 13, 14 is modified. Therefore, a portion of the arrangement which is similar to that shown in FIG. 1 will be omitted from description by using the same reference characters as those used in FIG. 1.

In the arrangement of FIG. 2, the output of the sample-and-hold circuits 13, 14 is connected with an evaluation function calculation circuit 31, 32, respectively. Specifically, the calculation circuit comprises a first loop including a calculator 33 for the carrying out the function $(P_i-P_{i-1})$, sguaring circuit 37 and adder 41 connected in cascade, and a second loop including a calculator 35 for carrying out the function $(P_i-P_{i-2})$, squaring circuit 39 and adder 43 connected in cascade. It will be noted that both loops are in shunt with each other and that the output of the respective loops is connected with a switching circuit 45. In a similar manner, the calculation circuit 32 comprises a first loop including a calculator 34 for the function $(P_i-P_{i-1})$, squaring circuit 38 and adder 42, and a second loop including a calculator 36 for the function $(P_i-P_{i-2})$, squaring circuit 40 and adder 44, both loops being connected with the output of the sample-and-hold circuit 14. It will be noted that both loops are in shunt with each other and that the output of the respective loops is connected with a switching circuit 46. Thus, the output of the sample-and-hold circuits 13, 14 is connected with calculation circuits 31, 32, respectively, which are constructed in an identical manner.

The purpose of the switching circuit 45, 46 is to provide a switching operation between the first and the second loop in the respective calculation circuits 31, 32, and the switching takes place in response to an instruction from an evaluation function selector 47. When the first loop is selected in the respective calculation circuits, the evaluation function calculated will be $\Sigma(P_i-P_{i-1})^2$ while it will be $\Sigma(P_i-P_{i-2})^2$ when the second loop is selected.

The outputs of the switching circuits 45, 46 are connected with accumulators 17, 18, which in turn feed an input to the comparison circuit 20. It will be noted that the accumulators 17, 18 also feed a drive control circuit 48 which in turn feeds the focus control circuit 21. The purpose of the drive control circuit 48 is to assure a high accuracy of focussing operation for a closely assembled and a dispersed image, by issuing an enable signal applied to the focus control circuit 21 whenever the output from the accumulators 17, 18 reaches a given value which is sufficient to enable a satisfactory focussing operation.

The operation of the embodiment shown in FIG. 2 is quite similar to that of the embodiment shown in FIG. 1, and therefore will not be repeated.

It will be seen that a calculation circuit which derives either evaluation function $\Sigma(P_i-P_{i-1})^2$ or $\Sigma(P_i-P_{i-2})^2$ alone may be used as shown in FIG. 1, or alternatively a calculation circuit having the capability of deriving either evaluation function may be used as shown in FIG. 2. Additionally, it is quite free to choose any other evaluation function such as $\Sigma(P_i-P_{i-3})^2$, $\Sigma(P_i-P_{i-4})^2$, etc. Furthermore, the combination of the scanner and photoelectric transducer elements may be replaced by a solid state image sensor.

What is claimed is:

1. Automatic focussing apparatus for a microscope having a specimen stage, an optical system and a focussing mechanism therefor to bring the image of a specimen at said stage into proper focus, said apparatus comprising a pair of photoelectric transducer elements disposed respectively short of and beyond the imaging position of a focussing optical system for receiving light images formed short of and beyond the imaging position of said focussing optical system; said focussing optical system including means for simultaneously directing successive picture elements towards said transducer elements; a pair of analog-to-digital converters connected with the output of respective transducer elements for converting an analog output from its associated transducer element which corresponds to each picture element into a digital quantity, a pair of sample-and-hold circuits connected with the converters for holding an output signal in the form of the digital quantity, a pair of calculation circuits for deriving one of the evaluation functions $\Sigma(P_i-P_{i-1})^2$ or $\Sigma(P_i-P_{i-2})^2$ where $P_i$ represents density information of a selected picture element represented by the digital signal, and wherein i represents the location of the picture element $P_i$ such that $P_i$ and $P_{i-1}$ represent the density information of adjacent picture elements while $P_i$ and $P_{i-2}$ represent density information of spaced picture elements a pair of accumulators connected with the respective calculation circuits for accumulating the calculated output, a comparison circuit for comparing the stored content of both accumulators, and a focus control circucit for operating a focussing mechanism in response to an output signal from the comparison circuit, thus adjusting the optical system to bring the image into focus.

2. Automatic focussing according to claim 1 in which light incidence to the pair of photoelectric transducer elements is effected through said directing means which is comprised of a half mirror which splits a single beam into two beam portions which impinge upon the elements through associated pinholes.

3. Automatic focussing apparatus according to claim 1 in which the light incidence to the photoelectric transducer elements is supplied by scanning the image of a specimen on the microscope, thereby causing the elements to produce a train of time spaced signals.

4. Automatic focussing apparatus for a microscope having a focussing mechanism, said apparatus comprising a pair of photoelectric transducer elements disposed short of and beyond the imaging position of a focussing optical system for receiving light images formed short of and beyond the imaging position, a pair of analog-to-digital converters connected with the output of the respective elements to convert an analog output from the associated transducer element which corresponds to each portion of the image into a digital quantity, a pair of sample-and-hold circuits respectively connected with the output of the converters for holding an output signal in the form of the digital quantity, a pair of evaluation function calculation circuits connected with the output of the respective sample-and-hold circuits, each calculation circuit including a first loop which comprises a calculator for deriving an output representing a function $(P_i-P_{i-1})$, a squaring circuit and an adder connected in cascade where $P_i$ represents density information of a selected portion of said image represented by the digital signal and including a second loop which comprises a calculator for deriving an output representing another function $(P_i-P_{i-2})$, wherein i, i−1 and i−2 represent the relative location of said portions of said image; a squaring circuit and adder connected in cascade, a switching circuit for switching between the first and the second loop of each calculation circuit, an evaluation function selector for activating the switching circuit, a pair of accumulators connected with the output of each calculation circuit for accumulating their outputs to provide a sum of the calculated results, a comparison circuit for comparing the stored content in the aforesaid accumulators, a focus control circuit responsive to a signal from the comparison circuit and another signal from the aforesaid accumulators to operate a focussing mechanism, thereby adjusting the optical system.

5. Automatic focussing apparatus for a microscope having a focussing optical system and a focussing mechanism, said apparatus comprising a pair of photoelectric transducer elements disposed on opposite sides of the imaging position of said focussing optical system for receiving light images formed short of and beyond the imaging position, first and second means connected with the output of respective transducer elements for converting the output signal from its associated transducer element which corresponds to each picture element into a digital quantity; third and fourth means for respectively periodically and temporarily storing the output signals of said first and second means; a pair of arithmetic means each coupled to said third and fourth means for deriving one of the evaluation functions $\Sigma(P_i-P_{i-1})^2$, $\Sigma(P_i-P_{i-2})^2$ where $P_i$ represents density information of a selected portion of the image represented by the digital signal, and wherein i, i−1 and i−2 represent the location of said image portions, a pair of accumulators connected with the respective arithmetic means for accumulating the outputs calculated by said arithmetic units, a comparison circuit for comparing the stored content of said accumulators, and a focus control circuit for operating said focussing mechanism in response to an output signal from the comparison circuit, thus adjusting the optical system.

6. Automatic focussing apparatus for focussing the image of a specimen for purposes of observation in a microscope, said microscope comprising a stage for receiving said specimen, an optical system and focussing means for operating the optical system to focus the image of the specimen placed on said stage, said automatic focussing means comprising:

first and second light sensitive means positioned respectively in front and beyond the image plane of said optical system;
means for simultaneously directing successive portions of said image to said light sensitive elements;
said light sensitive elements generating signals representative of the intensity of light incident thereon;
sampling means for each light sensitive element for sampling the signal representative of each successive image portion;
means for forming the difference between successive signals derived from said sampling means;
means for squaring said difference signal;
means for accumulating said squared signals;
comparison means for comparing the accumulated total and focus control means responsive to said comparison means for operating said focussing means to bring said image into proper focus in accordance with the magnitude and polarity of said difference signal.

* * * * *